United States Patent [19]

Hatch

[11] Patent Number: 4,583,749
[45] Date of Patent: Apr. 22, 1986

[54] SEAL ASSEMBLY FOR A VEHICLE AIR CONDITIONING COMPRESSOR

[75] Inventor: Frederick R. Hatch, Ann Arbor, Mich.

[73] Assignee: The Mather Company, Sylvania, Ohio

[21] Appl. No.: 697,429

[22] Filed: Feb. 1, 1985

Related U.S. Application Data

[63] Continuation of Ser. No. 502,556, Jun. 9, 1983, abandoned.

[51] Int. Cl.[4] .............................................. F16J 15/32
[52] U.S. Cl. .................................. 277/152; 277/184; 277/DIG. 6
[58] Field of Search ................ 277/152, 153, 182–184, 277/84, DIG. 6

[56] References Cited

U.S. PATENT DOCUMENTS

| | | | |
|---|---|---|---|
| 2,804,325 | 8/1957 | Riesing | 277/153 |
| 3,572,732 | 3/1971 | Sekulich | 277/153 |
| 3,771,799 | 11/1973 | Sekulich et al. | 277/153 X |
| 4,375,290 | 3/1983 | Zucchi et al. | 277/152 X |

Primary Examiner—Robert S. Ward
Attorney, Agent, or Firm—Marshall & Melhorn

[57] ABSTRACT

An annular seal assembly which is adapted to be utilized in a vehicle air conditioning compressor. The seal assembly includes an outer annular support housing which is sealingly secured to the main body of the compressor in coaxial relationship with a rotatable shaft. An annular PTFE seal element includes an outer annular periphery sealingly secured to the support housing, and an inner annular periphery adapted to sealingly engage the rotatable shaft. In the preferred embodiment of the invention, the outer annular housing of the seal assembly is formed to include an inwardly facing annular recessed portion which is adapted to receive an annular gasket ring utilized to provide a seal between the PTFE seal element and the outer annular housing. The outer annular housing is also provided with an outwardly facing inner annular recessed portion which is adapted to receive a suitable tool for removing the seal element from the main body of the compressor.

9 Claims, 4 Drawing Figures

SEAL ASSEMBLY FOR A VEHICLE AIR CONDITIONING COMPRESSOR

This application is a continuation of my copending application Ser. No. 502,556, filed June 9, 1983 and now abandoned.

BACKGROUND OF THE INVENTION

The present invention relates generally to an annular seal assembly adapted to be coaxially positioned about a rotatable shaft and, in particular, to a seal assembly which includes a polytetrafluoroethylene (PTFE) sealing element and is designed for use in a vehicle air conditioning compressor.

Rotary shaft seal assemblies which are utilized in vehicle air conditioning compressors are subject to a wide variety of operating conditions based upon the speed of the compressor shaft and the ambient air temperature. One of the most commonly used compressor shaft seals is a mechanical face type seal comprising a rotatable carbon sealing ring which is adapted to sealingly engage a polished surface of a stationary ceramic ring. The ceramic ring includes an outer periphery which is adapted to be secured to the main body of the compressor. The carbon sealing ring is adapted to rotate with the compressor shaft and is biased into sealing engagement with the ceramic ring. While such a seal assembly has proved to be relatively satisfactory, the assembly is relatively expensive to manufacture.

Annular seal assemblies which utilize a polytetrafluoroethylene (PTFE) seal element for sealingly engaging a rotatable shaft have been proposed. Examples of such PTFE seal assemblies can be found in U.S. Pat. Nos. 3,572,732 and 3,771,799. However, due to the environment in which they must operate, these types of annular PTFE seal assemblies have proved to be unsatisfactory when utilized as a shaft seal in a vehicle air conditioning compressor.

SUMMARY OF THE INVENTION

The present invention relates to an annular seal assembly which is adapted to be utilized in a vehicle air conditioning compressor. The air conditioning compressor includes a main body having a rotatable shaft extending therefrom. The annular seal assembly is mounted in the compressor main body and sealingly engages the rotatable shaft. The seal assembly cooperates with the main body to define an internal chamber in the main body which contains a pressurized mixture of freon and lubricating oil.

The seal assembly includes an annular support housing which is sealingly secured to the compressor main body in coaxial relationship with the rotatable shaft. An annular PTFE seal element includes an outer annular periphery sealingly secured to the support housing, and an inner annular periphery adapted to sealingly engage the rotatable shaft. The inner periphery of the seal element extends axially inwardly along the shaft and into the pressurized chamber. The pressurized mixture of freon and lubricating oil urges the sealing element into sealing engagement with the rotatable shaft.

In the preferred embodiment of the invention, the outer annular housing of the seal assembly includes an annular wall portion having an inwardly facing annular recessed portion which is adapted to receive an annular gasket means. The annular gasket means is utilized to provide a seal between the outer annular periphery of the PTFE seal element and the outer housing. The annular wall portion is also provided with an outwardly facing annular recessed portion which is adapted to receive a suitable tool for removing the seal assembly from the main body of the compressor.

BRIEF DESCRIPTION OF THE DRAWINGS

The above, as well as other features and advantages of the present invention, will become readily apparent to one skilled in the art from reading the following detailed description in light of the accompanying drawings in which.

DESCRIPTION OF THE PREFERRED EMBODIMENT

Figure 1:
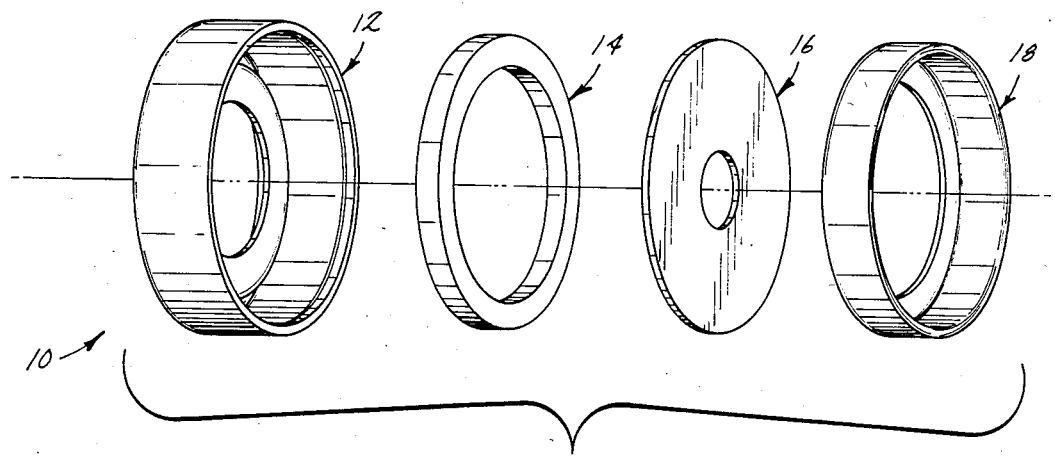
FIG. 1 is an exploded perspective view illustrating the individual components of the seal assembly of the present invention.
Figures 2, 3:
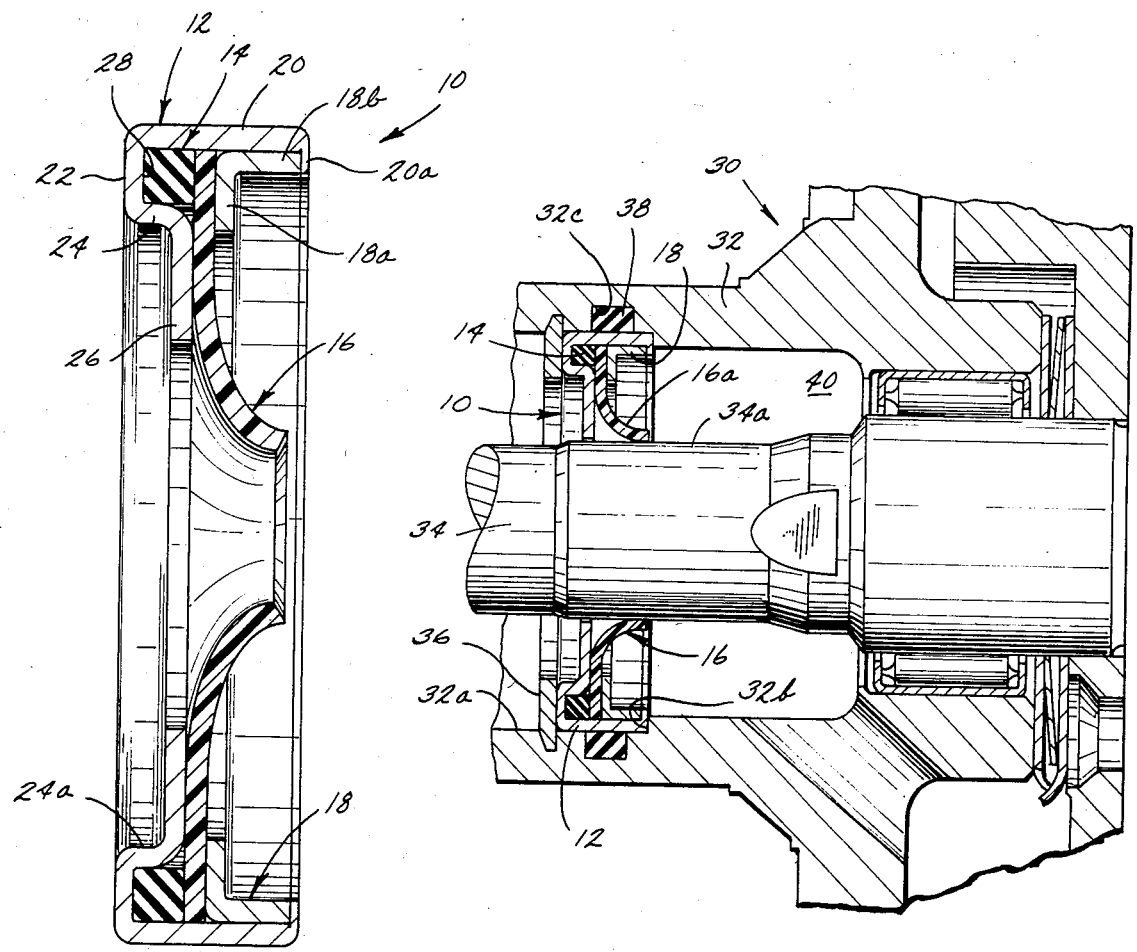
FIG. 2 is a sectional view of an assembled version of the seal assembly of the present invention.
FIG. 3 is a fragmentary sectional view illustrating the seal assembly of FIG. 2 positioned within the main body of a vehicle air conditioning compressor and sealingly engaging a rotatable shaft.

Referring to FIGS. 1 and 2, there is shown a seal assembly 10 embodying the principles of the present invention. FIG. 1 is an exploded perspective view of the individual components of the seal assembly, while FIG. 2 is a sectional view of an assembled version of the seal. The seal assembly 10 includes four components, an outer annular support housing 12, an inner annular gasket 14, a PTFE seal element 16, and a securing ring 18.

The outer housing 12 includes an outer cylindrical portion 20 having one end which extends radially inwardly to form an outer annular wall portion 22. The inner annular periphery of the wall portion 22 extends axially inwardly to form an inner cylindrical portion 24. The inner end of the cylindrical portion 24 extends radially inwardly to form an inner annular wall portion 26 spaced inwardly relative to the outer annular wall portion 22.

As shown in FIG. 2, the outer cylindrical portion 20, the outer annular wall portion 22, and the inner cylindrical portion 24 cooperates to form an inwardly facing annular recessed cavity 28 for receiving the annular gasket 14. Also, the inner cylindrical portion 24 defines a radially inwardly facing tool engaging surface 24a which, as will be discussed, is adapted to receive a suitable tool having an expanding mechanism which expands outwardly to engage the surface 24a to facilitate removal of the seal assembly 10 from an associated compressor body.

As shown in FIG. 2, the outer periphery of the PTFE seal element 16 is formed of a diameter substantially equal to the inner diameter of the outer cylindrical portion 20. A marginal edge of one surface of the outer periphery of the sealing element 16 is adapted to sealingly engage the annular gasket 14.

The securing ring 18 includes a radially inwardly extending flange member 18a which engages the inner face of the outer periphery of the seal element 16 and compresses the gasket 14 into the recessed cavity 28 to produce a seal between the outer housing 12 and the seal element 16. The securing ring 18 includes an axially extending flange member 18b having an outer end which abuts against the inner surface of an inwardly depending flange 20a of the housing 12 to effectively secure the associated components within the housing.

The annular gasket 14 is typically constructed of an elastomeric material such as neoprene, for example. The PTFE sealing element typically includes a powdered graphite filler material to enhance lubricating characteristics established between the seal element 16 and the associated rotatable shaft. It has been found that a PTFE composition which includes a 15% by weight graphite filler has performed satisfactorily in the present application.

The seal element 16 is typically formed by a sintering technique wherein a preblended mixture of polytetrafluoroethylene (PTFE) granules and powdered graphite is introduced into a hollow die to form a hollow cylindrical sleeve. The blended mixture is typically exposed to a pressure of 8-12 thousand PSI for a period of 3 to 10 seconds. The sleeve formed by such operation typically has a 1.250 inch outer diameter and a 0.280 inch inner diameter and an overall length of approximately 2 inches. This process is suitable for forming a sleeve having relatively uniform density throughout, but does not have considerable inherent physical strength characteristics.

To achieve the desired strength characteristics, the sleeve is removed from the forming die and placed into a curing oven. The sleeve is typically heated to a temperature of from 680°-720° F. and allowed to remain at the curing temperature for a period of from 1½ to 4 hours. Then the sleeve is allowed to slowly cool to room temperature. Once the temperature of the sleeve element has been reduced to room temperature, the sleeve is removed from the oven.

Next, the sleeve is machined into separate sealing elements 16. Initially, the sleeve is placed on a lathe or the like to affect concentricity between the outer and inner diameters of the sleeve. Typically, the above-noted sleeve is turned to have an outer diameter of 1.190 inches and an inner diameter of 0.320 inches. As soon as the concentricity of the sleeve element has been successfully effected, at least one end of the sleeve is faced to assure a right angle between the facing surface and the outside diameter of the sleeve.

The sleeve is then cut into separate elements of a thickness of from 0.025 to 0.050 inch by a cutting tool, such as a knife blade, to assure that the opposite faces of the sealing elements are smooth and contain no machine lines therein.

Thence, the sealing element is formed into the support housing 12 in a manner, generally indicated in FIG. 2. When the combination of elements is formed into the assembly shown in FIG. 3, the sealing element 16 is still substantially planar in configuration. Prior to its application to an associated relatively rotating shaft element, the seal element 16 is stretched and caused to assume a slight radius by forcing a tapered plug having a taper of from approximately 7° to 15° and commencing with a small diameter nose to a final diameter of approximately the same diameter as the shaft with which the seal is to be utilized. During this operation, the material of the seal element 16 is stretched, but due to the memory characteristics of the chemical composition thereof, the inner diameter of the seal element 16 partially recovers such that a snug fit is achieved between the inner diameter of the sealing element and the outer diameter of the shaft to be sealed. The diameter of the shaft in the above example is approximately 0.562 inch.

Then the assembly as illustrated in FIG. 2 is ready for insertion onto a shaft 34 and is initially caused to traverse the outer diameter 34, over a tapered portion to the shaft surface 34a. At all times the sealing element 16 maintains its open edge toward the direction of insertion.

Referring to FIG. 3, there is shown a fragmentary sectional view of a vehicle air conditioning compressor unit 30 which includes a main body or housing 32 having a shaft 34 rotatably mounted therein. The main body 32 includes an annular channel 32a for receiving the seal assembly 10. The inner end of the seal assembly 10 abuts against a shoulder 32b formed in the main body 32. A snap ring 36 is secured within an associated groove formed in the annular channel 32a for securely mounting the seal assembly 10 within the main body 32. An adjacent annular groove 32c is formed in the annular channel 32a for receiving a gasket ring 38 to provide a fluid-tight seal between the outer periphery of the housing 12 of the seal assembly 10 and the air conditioning compressor main body 32.

It will be noted that the diameter of the opening of the annular wall portion 26 is typically formed to be 0.030-0.120 inch larger than the outside diameter of the shaft 34a with which it is adopted to seal. Accordingly, in the example referred to above, the opening in the annular wall portion 26 would be in the order of 0.590 to 0.680 inch diameter. The relatively close fit between the opening in the annular wall portion 26 and the outside diameter of the associated relatively rotating shaft member 34 will prevent the seal element 16 from extruding through the opening between the annular wall and the shaft and will also act to prevent or minimize the entry of foreign matter between the sealing surfaces of the element 16 and the shaft 34.

The seal assembly 10 cooperates with the main body 32 to define a chamber 40 on the inner side of the seal assembly 10 which contains a pressurized mist of freon and lubricating oil. As shown in FIG. 3, the inner annular periphery of the PTFE sealing element 16 is adapted to engage a cylindrical surface 34a of the shaft 34. The pressurized fluid in the chamber 40 functions to exert forces on the inwardly facing surface 16a of the seal 16 to maintain the seal in sealing engagement with the surface 34a of the shaft 34.

Figure 4:
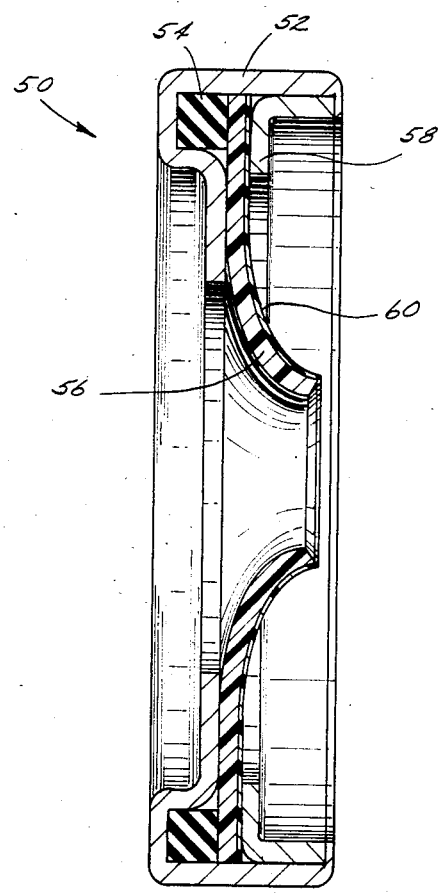
FIG. 4 is a sectional view of an alternate embodiment of the seal assembly of the present invention.

Referring to FIG. 4, there is shown an alternate embodiment of a seal assembly 50 according to the invention. The seal assembly 50 is similar to the seal assembly 10 shown in FIGS. 1, 2, and 3, and includes an outer housing 52, an inner annular gasket 54, a PTFE seal element 56, and a securing ring 58. However, in this embodiment, a separate wafer 60 of fluorinated ethylene propylene (FEP) or per fluora alkoxy (PFA) is positioned adjacent the inside surface of the PTFE seal element 56. The wafer 60 is typically in the range of 0.001 to 0.010 inch thick and can be either heat laminated or simply held against the PTFE element.

It has been found that the PFA or FEP wafer 60 produces a seal structure with a reduced permeability to helium as compared to the structure of FIGS. 1, 2, and 3. The PTFE element 56 provides suitable wear resistance properties when in contact with a rotating shaft, while the PFA or FEP wafer 60 reduces the permeability of the seal assembly to helium. Such a structure is important in instances wherein helium is utilized as a means for testing the seal assembly.

While the foregoing description refers to a 15% graphite filler as providing satisfactory performance, it should be understood that a wide variety of fillers such as molybdenum di-sulfide, glass fibers, and others may provide the same satisfactory performance with a variety of filler percentages such as 5% or 10%.

In accordance with the provisions of the patent statutes, the principle and mode of operation of the present invention have been described in what is considered to represent its best embodiment. However, it should be understood that the present invention can be practiced otherwise than as specifically illustrated and described without departing from its spirit or scope.

What is claimed is:

1. A vehicle air conditioning compressor including a main body having a rotatable shaft extending therefrom, an annular seal assembly adapted to be mounted in said compressor main body and to sealingly engage said rotatable shaft to define an internal chamber in said main body, said chamber containing a pressurized mixture of freon and lubricating oil, said seal assembly including an annular support housing adapted to be sealingly secured to said compressor main body in coaxial relationship with said rotatable shaft, an annular resilient polytetrafluoroethylene seal element having an outer annular periphery sealingly secured to said support housing and an inner annular periphery adapted to sealingly engage said rotatable shaft, said inner periphery of said seal element extending axially inwardly relative to said outer periphery along said shaft into said pressurized chamber, said outer annular periphery and said inner annular periphery being connected by a radius portion of said seal element, said inner annular periphery terminating in contact with said rotatable shaft, said pressurized mixture of freon and lubricating oil exerting a force on the side of said sealing element which faces said chamber to cause said inner periphery of said seal element to be urged into sealing engagement with said rotatable shaft.

2. A vehicle air conditioning compressor as recited in claim 1 wherein said outer annular support housing includes an outer cylindrical portion and an annular wall portion extending generally radially inwardly from one end of said cylindrical portion, said annular wall portion having an inwardly facing annular recessed portion formed therein; an annular gasket means adapted to be inserted within said inwardly facing annular recessed portion of said housing and sealingly engage said housing; said annular polytetrafluoroethylene seal element having an outer periphery with a diameter substantially equal to the inner diameter of said cylindrical portion, said seal element adapted to be inserted within said housing and sealingly engage said annular gasket means; an inner securing ring adapted to be inserted into said housing for urging said seal element into sealing engagement with said gasket means; and means on said outer housing for retaining said securing ring within said housing.

3. A vehicle air conditioning compressor as recited in claim 2 wherein said housing includes a radially inwardly facing tool engaging surface whereby a suitable expandable tool means can be expanded outwardly to engage said tool engaging surface to remove said seal assembly from said compressor.

4. A vehicle air conditioning compressor as recited in claim 1 wherein said polytetrafluoroethylene seal element includes a graphite filler.

5. A vehicle air conditioning compressor as recited in claim 1 including an annular wafer of fluorinated ethylene propylene positioned adjacent the side of said seal element which faces said chamber.

6. A vehicle air conditioning compressor as recited in claim 1 including an annular wafer of per fluora alkoxy positioned adjacent the side of said seal element which faces said chamber.

7. A combination as recited in claim 1 wherein said annular support housing includes an outer cylindrical portion having one end extending radially inwardly to form an outer annular wall portion and then extending axially inwardly to form an inner cylindrical portion, said outer cylindrical portion, said outer annular wall portion and said inner cylindrical portion forming an inwardly facing annular recessed cavity for receiving a gasket.

8. A combination as recited in claim 7 wherein said inner cylindrical portion has a radially inwardly facing surface for engaging a seal removal tool.

9. A combination as recited in claim 7 wherein said one end of said outer cylindrical portion further extends radially inwardly to form an inner annular wall portion in contact with one surface of said outer annular periphery of said seal element.

* * * * *